Nov. 4, 1952   D. C. GREEN   2,616,453
HYDRAULIC ACCUMULATOR AND VALVE THEREFOR
Filed June 25, 1951   2 SHEETS—SHEET 1
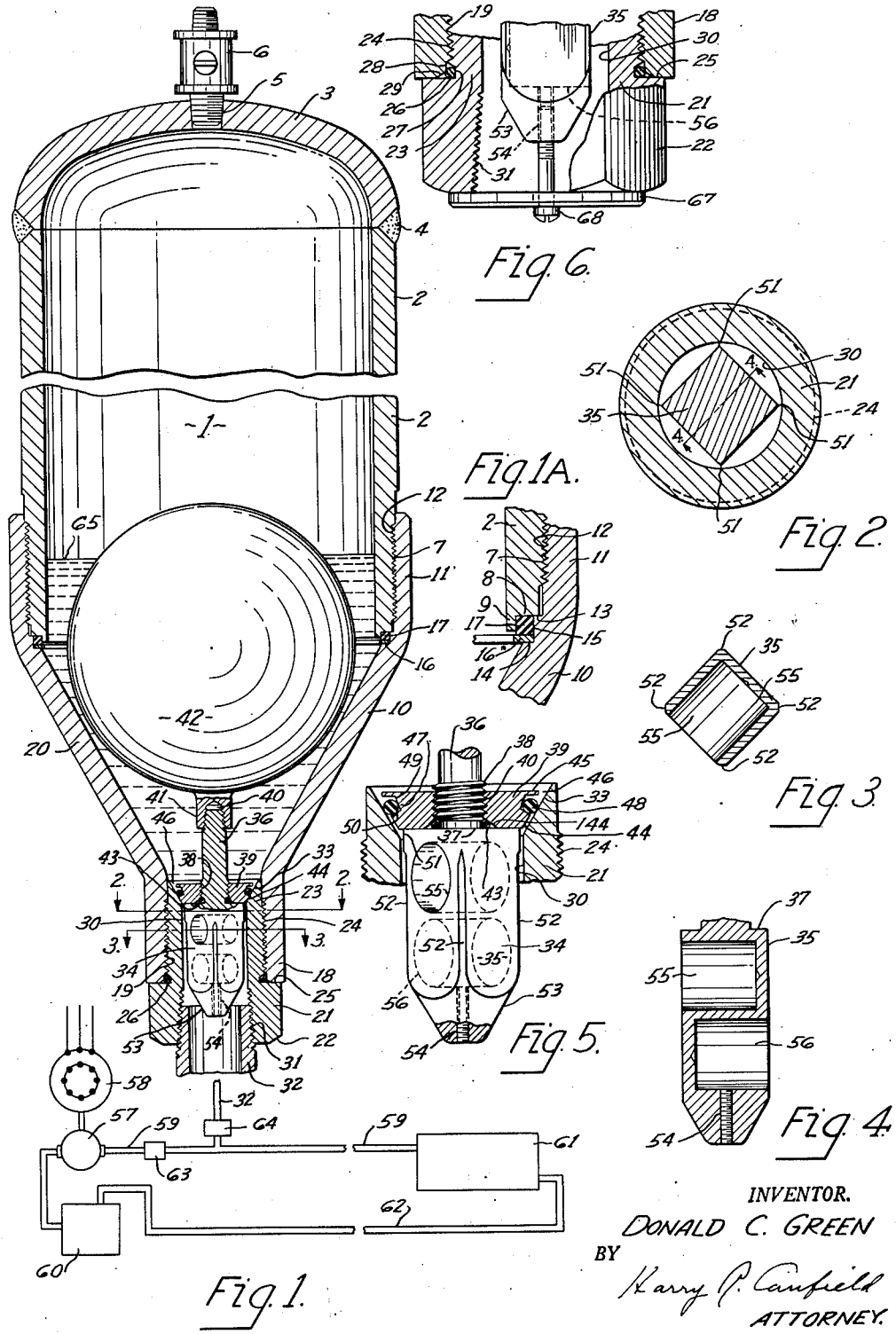
INVENTOR.
DONALD C. GREEN
BY
Harry P. Canfield
ATTORNEY.

Nov. 4, 1952 D. C. GREEN 2,616,453
HYDRAULIC ACCUMULATOR AND VALVE THEREFOR
Filed June 25, 1951 2 SHEETS—SHEET 2

INVENTOR.
DONALD C. GREEN
BY Harry P. Canfield
ATTORNEY.

Patented Nov. 4, 1952

2,616,453

UNITED STATES PATENT OFFICE 2,616,453

HYDRAULIC ACCUMULATOR AND VALVE THEREFOR

Donald C. Green, Russell, Ohio

Application June 25, 1951, Serial No. 233,281

13 Claims. (Cl. 138—30)

This invention relates to hydraulic accumulators.

As is well known, in various arts, liquid under pressure is distributed by a conduit system from a pump, to machines to supply operating power thereto. In order to maintain the pressure substantially at a desired value, or within a permissible range of variation, as the quantitative demand by the machines varies, a so-called accumulator is connected to the hydraulic distributing system. In its simplest form, the accumulator comprises a walled chamber having an entrance opening at a low point thereof communicating with the hydraulic system into which liquid from the system flows compressing air trapped in the upper part of the chamber above the liquid, subjecting the air to the pressure of the system.

The chamber acts as a liquid reservoir, and in the event of a temporary demand by the machines beyond the capacity of the pump, liquid is forced out of the chamber by the air pressure above it to supply the excess demand; and when the excess demand ceases, the reservoir takes in a reserve supply of liquid again.

The air pressure in the accumulator also acts as a cushion to relieve the system from the effects of surges or peaks of hydraulic pressure, such as might occur, if, for example, a valve in the system were suddenly closed.

The present invention relates generally to accumulators of this class.

In the use of such an accumulator, as referred to, if an excess demand should persist, or if a large volume leak should occur in the system, the accumulator (in the absence of anything to prevent it) exhausts its reserve of liquid into the system, and then air from the chamber follows and enters the system, and thereafter interferes with its operation.

Various kinds of valves have been proposed for accumulators to close the liquid exit from the chamber when the liquid therein reaches a predetermined low level, to prevent such injection of accumulator air into the system; and, in cases where a particular gas instead of air is used in the chamber, such for example as nitrogen, for its chemically inactive property, to prevent the loss of the gas.

Such valves have not been satisfactory; because to accomplish their purposes, they must be absolutely leak proof under pressure when closed, and unsolved problems have arisen in the attempts to make leak proof valves in this particular environment.

In some cases, the proposed valves have been float valves, descending slowly and gradually upon a valve seat to close an exit valve port as the liquid level in the accumulator chamber descends. But such valves also have had the objection of not being leak proof.

One reason is that the pressure in the valve closing direction is the differential of the pressures inside and outside the chamber and in some cases, this differential is small, and float valves, as proposed when seating under small pressure, do not seat in a manner to be leak proof when subsequently subjected to greater pressure.

Another reason, in the case of float valves, is that the float is apt to drift or wander from side to side in the accumulator liquid, and as it descends and finally deposits the valve on the valve seat, it often does so inaccurately leaving the valve port partly open.

Guides for such float valves have been proposed to guide the descending valve to its seat, but such guides are objectionable because if stationary, they do not guide both the valve and the float, or if movable with the valve, they comprise guiding parts or pilots that slide on the valve seat or upon the periphery of the port and cut or wear them so that after a few operations, the valve, even if it is properly seated, is not leak proof.

When float valves are used with accumulators, it is desirable to manufacture the chamber and the float and its connected valve already assembled, ready to be installed by merely connecting the chamber to the hydraulic system.

The float and its valve therefore are inside the chamber, inwardly beyond the valve port and inaccesible from the outside, and are free to move around inside the chamber. During transportation, the float and the valve are often thrown against the wall of the chamber and damaged, so that when put into operation, they fail to function as intended.

It is among the objects of the invention to provide an accumulator having a chamber, and a valve construction controlling entrance to and exit from the chamber, which overcomes the defects of and objections to prior accumulators, including those described above.

Another object is to provide an accumulator, and a float valve construction therefor, constructed so that the valve is guided to a valve seat to close a port therein generally in an improved manner.

Another object is to provide a unitary float and valve construction for an accumulator, comprising means to guide the float itself in its descent to prevent excessive sidewise wandering and swaying of the float from side to side; and comprising a valve pilot for the valve that enters the valve port ahead of the valve as the valve approaches the seat, and aligns the valve coaxially with the port by sliding contact with portions of the chamber entrance and exit below the seat and not in wearing contact with the valve seat or with the wall of the port.

Another object is to provide for an accumulator an improved construction of leak proof valve and valve seat.

Another object is to provide a float and a float valve connected thereto, provided with means, whereby, the valve may be clamped rigidly upon the seat by means operable from outside of the chamber to prevent movement of the float and valve within the chamber during transportation, and, conversely, operable to release them at the time of installing the accumulator for use.

Another object is to provide an improved piloting device for piloting or steering an accumulator float valve accurately to its seat.

With these objects in view, and others which will occur to those skilled in this art, the invention comprises an accumulator, and a float valve having the improved features of construction and mode of operation referred to above.

The invention is fully disclosed in the following description taken in connection with the accompanying drawing, in which Fig. 1 is a longitudinal sectional view of an accumulator embodying the invention;

Fig. 1A is a view illustrating fragmentarily, a portion of Fig. 1 to a larger scale;

Fig. 2 is a cross sectional view taken on the plane 2—2 of Fig. 1;

Fig. 3 is a sectional view from the plane 3—3 of Fig. 1 with parts at and beyond the section plane omitted;

Fig. 4 is a fragmentary longitudinal sectional view taken on the plane 4—4 of Fig. 2;

Fig. 5 is a fragmentary view showing a part of Fig. 1 to an enlarged scale;

Fig. 6 is a fragmentary view of a part of Fig. 1 from a section plane at 90° to the section plane of Fig. 1; and showing additionally a clamp device for holding movable parts stationary in transportation;

Figure 7:
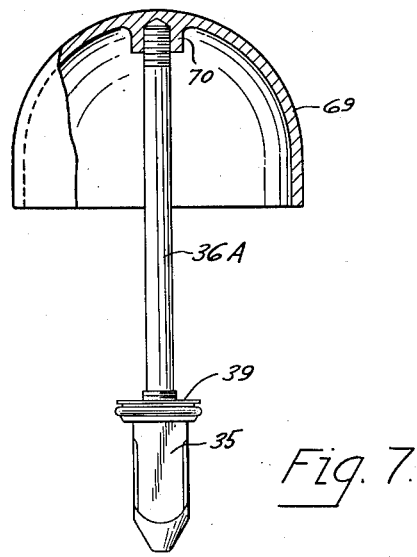
Figs. 7 and 8 are views illustrating modifications of a float shown in Fig. 1.

In the following description of the preferred embodiment of the invention shown in the drawing, certain dimensions, and quantities and materials are referred to. These are merely for illustrative purposes and are not limitations of the scope of the invention. The actual invention is set forth in the appended claims.

Referring to the drawing, there is shown at 1 an accumulator chamber comprising an upper cylindrical chamber wall or cylinder 2, preferably formed from a length of seamless steel tubing. The tubing may be of a size having an inside diameter of 5¾ inches and a wall thickness of ⅜ inch; and a suitable length of which may be anything from 8 inches to 40 inches or more, depending upon the gallons capacity wanted.

A dome shaped cap 3 of forged steel of ⅜" wall thickness is welded as at 4 to the upper end of the cylinder 2 and has a pipe threaded opening 5 into which is screwed a one way manually operable valve 6.

The lower end portion of the cylinder 2 is externally threaded as at 7 for about 2 inches therealong, and at the end is of reduced diameter providing a planar end surface 8 and an annular depending flange 9 inwardly thereof.

The chamber 1 has a die-drawn steel funnel shaped bottom 10, of ⅜" wall thickness. The upper end of the bottom 10 is cylindrical as at 11 and internally threaded as at 12 to screw upon the threads 7 of the cylinder 2; and below the threads, see Fig. 1A, has an internal shoulder 13, for bottoming on the end surface 8, and below the shoulder 13 has an internal shoulder 14 and between the shoulders 13 and 14 has a cylindrical side wall 15.

A steel washer 16 lies upon the shoulder 14 and a rubber or like deformable sealing ring 17 preferably of rectangular cross section, lies upon the washer and fits within the side wall 15 and the flange 9 and end surface 8.

When the cylinder 2 and bottom 10 are screwed together, the sealing ring 17 is clamped between the enlarged surface provided by the washer 16 and the end surface 8 of the cylinder 2, and deformed into pressure engagement with the side wall 15 and the flange 9 to effect a seal thereat for the threads 7—12, the shoulder 14 sliding on the washer 16 as it is turned and preventing churning or mutilating of the ring 17; and the shoulder 13 finally bottoming on the end surface 8.

As shown in Fig. 1, the lower end portion of the bottom 10 is also cylindrical, constituting a neck 18 of smaller diameter than the upper end thereof, a suitable inside diameter being 1⅝ inches; and the neck 18 may suitably be about 1¾ inches long; and it is threaded internally as at 19.

The intermediate part 20 of the bottom is conical at a cone angle of 60° or 30° on a side.

A valve seat element 21, see also Fig. 6 made from 2" hexagonal bar stock stainless steel, has a hexagonal head 22 on its lower end, and above the head is turned down to provide a shank 23 threaded as at 24 to screw into the threads 19 of the neck 18; an annular shoulder 25 being provided on the head 22 to bottom upon the lower end of the neck 18.

A sealing ring 26 is lodged in a groove 27 in the shank at the lower end of the thread 24; and the lower end of the neck 18 has an annular groove 28 and is bevelled as at 29; these parts providing an annular pocket containing the ring 26; and when the hexagonal head 22 is drawn tight against the end of the neck 18, the ring 26 is put under deforming pressure in the pocket and effects a seal between the neck 18 and the valve seat element 21 to seal the threads 19—24.

The valve seat element 21 has a cylindrical 1⅛" diameter bore 30 therethrough axially thereof, thus making the upper end of the valve seat element annular; and the lower end of the bore 30 is pipe threaded as at 31 to receive a pipe or conduit 32 from the hydraulic system to be referred to.

The annular upper end of the valve seat element 21 is made concavely conical, to a cone apex angle of preferably 60° or 30° on a side, and finished smooth, and constitutes a valve seat 33, the coaxial opening therethrough provided by the bore 30, constituting the valve port.

An integral or self contained assembly of valve, valve pilot and float, is provided as follows.

The valve pilot shown generally at 34 comprises a pilot body 35 preferably made from square section bar stock, ¾" square, preferably aluminum, and turned down at one end to provide a coaxial stem 36, and leaving a squared-off end shoulder 37 at the base of the stem.

The stem 36 immediately above the body 35 is threaded as at 38 and a valve 39 generally of circular disc form has a coaxial threaded hole 40 therethrough and is screwed onto the threads 38 and tight against the pilot end shoulder 37.

The stem 36 extends upwardly beyond the valve 39 and at its upper end is screwed into a boss 41 on the under side of a float ball 42, preferably made of steel, the ball being about 5 inches in outside diameter.

The said valve 39, shown also in Fig. 5, is made of stainless steel and is flat on its bottom to make flat leak proof contact with the pilot end shoulder 37 as aforesaid, but if preferred, a sealing ring 43 of rubber or like deformable material shown at 43 Fig. 1 and Fig 5, may also be used, and in such case, a pocket therefor is made by a counter bore 144 at the inner end of the threaded hole 40.

Above its bottom, the valve has an annular conical seating surface 44 at a cone angle and of a diameter to fit and seat upon the valve seat 33, and is shown so seated in Fig. 1, and not quite seated in Fig. 5.

At the top of the valve it has a horizontal flange 45 of such diameter that its periphery clears the valve seat 33 as shown at 46 in Fig. 1 and Fig. 5.

Between the conical seating surface 44 and the flange 45 is an annular groove 47 in which is contained a sealing ring 48 of rubber or like resilient deformable material of the so-called O-ring type. The bottom 49 of the groove is conical at a cone angle of 40° or 20° on a side tapering toward the bottom of the valve. The ring 48 is of circular cross section, smaller than the vertical width of the groove 47. The ring constrictingly encircles the bottom 49 of the groove and by action of its resilience, rolls or slides down along the groove bottom and normally rests against the lower side wall 50 of the groove as shown in Fig. 5. The cross sectional diameter of the ring 48 is greater than the depth of the groove 47 so that its outer periphery normally projects beyond the conical surface 44 of the valve as shown in Fig. 5. Operation of the foregoing features of the valve will be described later.

The length of the stem 36 is coordinated with the diameter of the float ball 42 and the conical slope and diameter of the conical intermediate part 20 of the bottom 10 so that when he valve 39 is seated on the valve seat 33, as in Fig. 1, the opposite sides of the ball just clear the conical wall 20 of the bottom.

The pilot body 35 is of the ¾" square cross sectional form of the original stock for a short distance, say ¼ inch, below the valve 39, and the square corners or dihedral angles thereof as at 51—51 fit the cylindrical 1⅛" bore 30 in the valve seat element 21 with about $\frac{1}{32}$" clearance; and therebelow, the corners of the square section are cut off to cylindrical contour to a diagonal width of about 1", as at 52, providing greater clearance, the total length of the portions 51 and 52 being about 1⅜ inches; and the cylindrical part of the bore 30 in which the body 35 is coaxial is about the same length, the pipe thread 31 being therebelow.

The lower end of the pilot body 35 is made conical and smooth as at 53, and rounded off on its extreme end; the total length of the pilot below the valve 39 being about 1⅞". The lower end of the body has a coaxial threaded hole 54 therein.

The weight of the pilot 34 is predetermined to be light, and that being one reason for preferably making it of aluminum; and to further reduce the weight of the pilot body 35 without unduly reducing its size for operative purposes, and to leave the said corners thereof intact, holes are drilled part way through, from opposite faces thereof as shown at 55—56 Fig. 4, thereby giving the body the form of an elongated skeleton frame with longitudinal corners 51 and 52 as described.

An illustrative hydraulic system to which the accumulator above described may be connected is shown diagrammatically in Fig. 1 as comprising a pump 57, driven by a motor 58, supplying a fire resistant liquid by way of a conduit 59, from a reservoir 60 to a machine or machines 61, at an operating pressure, of, say, 1000# per square inch, the liquid being returned at the reservoir 60 by a conduit 62, and a check valve 63 may be provided in the line of the conduit 59 if desired. The accumulator is connected as shown to the conduit 59 between the pump 57 and load 61 by the said conduit 32, and a cut off valve 64 may be provided in the conduit 32.

To prepare the accumulator above described for connection to the system, the accumulator is held upright with the valve 39 on its seat 33, and the chamber is filled with gas under pressure. The gas may be air, but a chemically inert gas such as nitrogen is preferred; and to this end a supply of nitrogen under pressure is connected to the valve 6 at the top of the chamber 1, and the valve 6 then opened and the air contents flushed out at the bottom, the valve 39 being raised temporarily for this purpose by pushing upon the lower end of the pilot body 35.

The valve 39 is then seated again, and the nitrogen in the chamber 1 is raised to a pressure of say 700# per square inch and the valve 6 is then closed.

The accumulator is then connected to the system by screwing it into the end of the conduit 32 by means of the hexagonal head 22, and the cut off valve 64 is opened.

The pump 57 is at this time in operation, and liquid at 1000# p. s. i. flows into the bore or valve port 30. When the pressure of liquid thus applied to the underside of the valve 39 overcomes the gas pressure above it, it is lifted from the valve seat 33 and the liquid flows up into the chamber 1 floating the ball 42. The ball lifts the valve 39 and pilot 34 and carries them up into the chamber 1 with the rising liquid therein. The rising level of liquid compresses the gas in the chamber 1 to 1000# p. s. i. at which balance is reached and the liquid level stops rising with the valve 39 suspended above the valve seat by the buoyancy of the floating ball 42.

The quantity of reserve liquid thus charged into the chamber 1 will be predetermined by the chosen length of the chamber as will be understood.

In the operation of the accumulator as hereinbefore referred to, its reserve liquid is discharged back through the valve port and through conduit 32 into the hydraulic system, by the gas pressure in the chamber 1, to maintain pressure in the system; and the level of liquid in the chamber falls and the float ball and valve descend with it, and when it has fallen to a predetermined minimum level, the valve 39 has thereby been returned to its valve seat 33, and closes the valve port 30 therethrough and cuts off further discharge of liquid.

The ball 42, being subjected to 1000 p. s. i. as is apparent, is made of steel, preferably of hemispherical thick walled steel forgings welded together to prevent collapsing under the pressure, and therefore has considerable weight. Its weight and that of the valve and pilot assembly above described connected to it are predetermined so that the ball floats almost submerged. The ball may be 5" in diameter and float with its top ¾" above the liquid level.

The proportions, dimensions etc. of the above described accumulator and of the float and valve assembly are predetermined so that when the float descends and closes the valve port, the minimum level of the liquid will be well above the sealed juncture at 17 between the two parts 1 and 10 of the chamber, so that if, due to abuse or the high pressure utilized, a leak should develop at the juncture, it will be a liquid leak and not a gas leak, and leaking liquid will appear at the outer ends of the threads 7 and can be visibly detected.

A suitable minimum liquid level is indicated at 65 in Fig. 1.

One of the important features of the invention is the operation of the valve to close and seal the port when the descending float ball lowers it into the valve seat.

As the valve approaches near to the valve seat 33, the rubber ring 48 is the first to make contact with the seat; and flow being thereby cut off, the valve 39 and ring 48 are immediately subjected to the full pressure above them, and the conical surface 44 on the valve below the ring, seats upon the conical valve seat 33, and the valve seat takes the pressure of the valve on it; but while the valve thus fits the valve seat with pressure, it is not intended to make perfect sealing contact therewith; this being done by the ring.

The pressure above the ring 48 is freely communicated to it through the clearance 46 around the periphery of the flange 45; and the pressure deforms the ring, pressing it into tight contact at its outer periphery against the valve seat 33, and at its inner periphery against the groove bottom 49, and at its lower side against the groove wall 50. The ring is thus deformed to fit a three sided annular pocket, and makes absolutely leak proof contact therewith; the greater the pressure the more the deformation of the ring and the tighter the seal.

Since the valve surface 44 fits the valve seat 33, there is no crack or crevice anywhere into which the pressure might force the ring and cut or mutilate it.

When in the operation of the accumulator, liquid is returned to the accumulator chamber upwardly through the conduit 32, the whole area of the pilot 35 is subjected to pressure and it raises the valve. At first the raised valve 39 is only slightly above the valve seat 33, and the liquid enters a thin annular crack between the valve seat 33 and the valve surface 44, and this immediately subjects the ring 48 to the force of the flow. This force pushes the ring 48 upwardly along the conical bottom 49 of the groove 47, the ring, by its resilience continuing to constructingly embrace the groove bottom. Since the cone angle (20°) of the groove bottom 49 is less than the cone angle (30°) of the valve seat 33, the ring has a radially inward retracting movement away from the valve seat which opens up a free annular flow passageway around the ring and up through the clearance 46 around the flange 45.

This flow may at times be at a low volumetric rate when the differential of the pressures on the upper and lower sides of the valve is small, but will nevertheless be at high velocity because of the small area of the said annular crack.

It has been found that if the groove 47 were not formed as described so that the ring could retreat from this force and get out of its way, it would be forced and squeezed between the valve seat and the upper annular edge of the valve, or torn out of the groove, and in any event, scarred or creased so that it could no longer be capable of making a perfect seal.

After the upward flow has continued long enough to raise the float ball 42 and the valve 39 with it a substantial amount, the port 30 is open enough to reduce the flow rate around the ring and no longer holds it up and by its constricting resilience it rolls or slides down the conical groove bottom 49 to its normal position.

Another important feature of the invention is the operation of the pilot body 35 to guide the valve 39 to the valve seat 33 for operation of the valve as just described.

It is desirable for the float ball 42 to always have clearance with the wall of the chamber 1, so as not to interfere with movement and seating of the valve. A clearance at the side of the ball of about ⅜" has been provided in the main chamber 2; and when the valve is seated, and the ball 42 is adjacent to the conical portion 20 of the bottom wall, the ball still has clearance of about ⅛".

The ball clearance however permits it to drift to one side or the other. The pilot body 35 is made to enter the valve seat 33 and then go on into the valve port or bore 30 and align the valve for accurate seating even if the ball has drifted to an extreme position in contact with the chamber wall, and its operation will be described for that extreme condition.

As the float ball descends, the smooth conical lower end 53 of the pilot body, and subsequently, the rounded corners 52 on the pilot at one side of the body 35, engage and slide upon the valve seat periphery at the smallest diameter portion thereof, which as explained above, is below the part of the valve seat 33 at which actual seal is effected by the sealing ring 48, and any wear at this point will not deteriorate the seal. The end of the body thus enters the port 30.

If the float ball remains in its extreme drifted position against the chamber wall, the axis of the pilot body 35 and of the ball 42 will now be at an inclination to the axis of the port bore 30, and the rounded corners 52 at the opposite side of the body, will engage the wall of the bore 30, and sliding downwardly thereon will rock the pilot body and ball more and more, as on a fulcrum, around the lower edge of the valve seat 33 first contacted, and bring the ball and body axis toward coincidence with the bore axis.

Upon further descent, all four of the full diameter square corners, 51, of the pilot body, will enter the port bore 30, and because of their small clearance therewith, will bring the said axes into substantial coincidence, and with the valve still spaced above the valve seat.

Finally, the valve 39 as a whole, now axially aligned with the valve seat 33 will descend accurately upon the seat.

Thus as will be apparent, wear or mutilation due to forcing the ball and valve axis to come into coincidence with the valve seat axis, occurs either on the valve seat at points below its ring sealing portions or occurs on the wall of the bore 30 below the valve seat, and in either case, can have no effect on the quality of the seal.

If the chamber 1 should for any reason be tipped out of the vertical, the end of the descending pilot body will first engage the wall 20; but the conical angle of the wall 20 being about the same as that of the valve seat 33, the wall 20 will guide the pilot body into the valve seat.

The chamber 1 as a whole will be seen to be generally of bottle-shape, with the valve seat element 21 screwed into the bottle neck 18. In assembling the body for transportation the float, valve, and pilot assembly are put inside before the bottom 10 is screwed on, and the valve seat element 21 is then screwed in. The bottle is then positioned vertically and the pilot body 35 enters the bore 30 and guides the valve 39 to the valve seat 33. A clamp device shown best in Fig. 6 is then applied, comprising a washer 67 bridging the end of the hexagonal head 22, and a screw 68 is projected through it and screwed into the threaded hole 54 in the pilot body, and the screw is turned to draw the pilot body down until the valve is tight on the valve seat. This prevents the float and valve assembly from being thrown about in the bottle during transportation or handling before installing. The clamp is removed at the time of installation.

Instead of a spherical hollow ball for the float, in some cases, it may be preferable to use a float of the "diving-bell" type, shown as a modification at 69 in Fig. 7. The float 69 is a forged steel walled body of cup-form, downwardly open, with a boss 70 at the center of the bottom into which the aforesaid stem here 36A, is screwed, carrying the valve 39 and pilot body 35 on its lower end.

Figure 8:
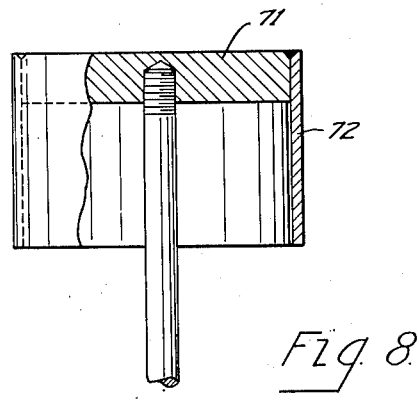

As another modification, the cup form float may be made by welding the periphery of a flat disc-like circular bottom 71 to the end of a piece 72 of steel tubing, as shown in Fig. 8.

The float of either Fig. 7 or Fig. 8 has buoyancy because of gas trapped therein as will be understood, and will perform in the same manner as the ball float above described.

What is claimed is:

1. A hydraulic accumulator comprising a walled chamber having a reduced diameter neck portion at a lower part of the chamber when in the position of use; a valve seat element sealed in the neck portion, and having a bore therethrough opening into the chamber providing an exit port for the chamber, and its inner end formed to provide a valve seat around the port; a unitary assembly in the chamber comprising a float, a valve pilot, and a valve between the float and pilot; the float adapted to float freely in liquid contained in the chamber and to suspend the valve and pilot above the valve seat; and the pilot adapted to enter the port and guide the valve to the valve seat upon descent of the float as liquid flows out of the chamber through the port.

2. A hydraulic accumulator comprising a walled chamber constructed to contain liquid under pressure, the chamber wall comprising a generally cylindrical wall portion closed at its upper end, when in the position of use, and continuing downwardly through a generally conical intermediate wall portion into a reduced diameter neck portion; a valve seat element sealed within the neck portion and having a bore therethrough providing an entrance and exit port from the chamber, and providing, at its inner end, an annular valve seat around the port; and at its outer end adapted to be connected to conduit means for conducting liquid into and out of the chamber through the port; a float element in the chamber adapted to float in liquid in the chamber; a valve connected to the under side of the float element adapted to be seated on the valve seat and seal the port upon descent of the float element as liquid exits from the chamber through the port; the float element having a circular periphery sized to fit within the conical wall portion with small clearance when the valve is on the seat; an elongated valve pilot joined to the under side of the valve and adapted to enter the port ahead of the valve and guide it to its seat by sliding engagment with the port bore wall below the valve seat.

3. A hydraulic accumulator comprising a walled chamber; an annular valve seat surrounding an entrance and exit port provided through the chamber wall at a lower portion thereof when in the position of use; the port being axially elongated below the seat in the form of a walled bore; a valve for the port having a lower annular peripheral surface portion engageable with a corresponding lower annular portion of the seat to support the valve on the seat and substantially close the port; the valve and seat having upper annular portions above said lower portions concurrently mutually engageable to completely seal the port; an elongated valve pilot connected to the underside of the valve and disposed in the bore when the valve is on the seat; a float connected to the upper side of the valve and adapted to float in liquid in the chamber and support the valve and pilot above the seat and to lower them with descent of the float upon falling of the liquid level in the chamber; the pilot formed to enter the port as it descends and successively slidingly engage the said lower annular valve seat portion and the wall of the bore, and guide the valve to the valve seat.

4. The construction described in claim 3 and in which the valve seat is conical, and the said lower portion of the valve is conical, and the said upper portion of the valve comprises a rubber or like ring in an annular groove in the valve, engageable with the conical valve seat.

5. A hydraulic accumulator comprising a tubular walled chamber, upright in the position of use; the lower part of the chamber wall having an elongated liquid inlet and outlet port therethrough, coaxial with the chamber wall; a coaxial annular valve seat surrounding the inner end of the port; a float adapted to float in liquid in the chamber; a valve, and an elongated valve pilot below the valve, suspended by the floating float, and descending therewith as liquid level in the chamber falls; the float sized to have small predetermined peripheral clearance with the chamber wall to dispose the descending pilot to enter the inner end of the port and, by sliding engagement with the wall of the port, to guide the valve coaxially to the valve seat.

6. A hydraulic accumulator comprising a walled chamber having a liquid entrance and exit port through a lower portion of its wall; a valve seat surrounding the port; a valve; a float; the valve connected to the under side of the float; the float adapted to float freely in liquid in the chamber and to raise and lower the valve away from and toward the valve seat, upon changes of liquid level; the port communicating with a guide bore below the valve seat; means to guide the valve to the valve seat comprising an elongated pilot connected to the underside of the valve, and tapered at its lower end, and adapted to enter the port and guide bore upon fall of the liquid level; the pilot having a plurality of circumferentially spaced longitudinal guide portions, which, adjacent to the under side of the valve, fit the wall of the guide bore with small clearance and farther down on the pilot have greater clearance therewith; the lower portion of the guide bore adapted to be connected to conduit means communicating liquid under pressure between the longitudinal guide portions of the pilot to the under side of the valve when the valve is on the seat.

7. A hydraulic accumulator comprising a walled chamber having a liquid entrance and exit port through a lower portion of its wall; a valve seat surrounding the port; a valve; a float; the valve connected to the under side of the float; the float adapted to float freely in liquid in the chamber and to raise and lower the valve away from and toward the valve seat, upon changes of liquid level; the port communicating with a guide bore below the valve seat; means to guide the valve to the valve seat comprising an elongated pilot connected to the under side of the valve, and tapered at its lower end, and adapted to enter the port and guide bore upon a fall of the liquid level; the pilot being of polygonal cross section and the dihedral corners thereof adjacent to the valve, fitting the bore wall with small clearance, and therebelow the dihedral corners being cut away to provide greater clearance; the lower portion of the guide bore adapted to be connected to conduit means communicating liquid under pressure longitudinally between the dihedral corners of the pilot to the under side of the valve when the valve is on the valve seat.

8. The construction described in claim 7 and in which weight of the pilot is reduced by transverse holes provided in its polygonal faces.

9. A hydraulic accumulator comprising a walled chamber having a liquid inlet and outlet port at a lower portion thereof when in the position of use; a conical valve seat surrounding the port; a valve; a float connected to the upper side of the valve floating in liquid in the chamber and raising and lowering the valve from and toward the valve seat upon changes of the level of the liquid in the chamber; gas under pressure in the chamber above the liquid subjecting the upper side of the valve to pressure when on the valve seat; the valve having a lower peripheral conical portion seating upon a lower conical portion of the conical valve seat; and the valve above its said conical portion provided with a circumscribing groove; a rubber-like sealing ring in the groove the outer periphery of the ring normally projecting beyond the conical valve portion and adapted to sealingly engage an upper portion of the conical valve seat with sealing pressure; the valve above the ring sized diametrically to expose the upper side of the ring to the pressure of liquid above the valve.

10. A hydraulic accumulator comprising a walled chamber having a liquid inlet and outlet port at a lower portion thereof when in the position of use; a conical valve seat surrounding the port; a valve; a float connected to the upper side of the valve, floating in liquid in the chamber and raising and lowering the valve from and toward the valve seat upon changes of the level of the liquid in the chamber; gas under pressure in the chamber above the liquid subjecting the upper side of the valve to pressure when on the valve seat; the valve having a lower peripheral conical portion seating upon a lower conical portion of the conical valve seat; and the valve above its said conical portion provided with a circumscribing groove; a rubber-like sealing ring in the groove the outer periphery of the ring normally projecting beyond the conical valve portion and adapted to sealingly engage an upper portion of the conical valve seat with sealing pressure; the valve above the ring sized diametrically to expose the upper side of the ring to the pressure of liquid above the valve, the groove being wider vertically than the ring, and the ring, by its resilience, constrictingly engaging the groove bottom, and the bottom of the groove being tapered outwardly upwardly at a cone angle less than that of the valve seat to permit the ring to be moved upwardly by impingement of liquid flow thereon occurring through the port when the valve is first raised from its seat by liquid under pressure on its under side, and to cause the ring to retract its outer perimeter away from the conical valve seat by its resilience, to allow free flow of liquid around the ring; the resilience of the ring returning it downwardly when the force of the liquid flow has decreased by further raising of the valve from the seat.

11. A hydraulic accumulator comprising a walled chamber, having a liquid inlet and outlet port at a lower portion thereof when in the position of use; the port being in the form of an elongated bore with a conical valve seat at its inner end; a float and a conical valve connected to the under side of the float and a valve pilot connected to the under side of the valve, all in a rigid assembly with a common axis; the float floating in the accumulator liquid and lowering the valve and pilot as the liquid level descends; the pilot formed to enter the port ahead of the valve as it descends and to slidingly engage the lower annular portion of the conical valve seat and later to slidingly engage the wall of the bore and thereby gradually and forcibly bring the axis of the assembly into coincident alignment with the axis of the conical valve seat, and to finally seat the valve thereon; the valve having a rubber sealing ring engageable with a portion of the conical valve seat above the said lower annular portion thereof which is slidingly engaged by the pilot when exerting said aligning force.

12. A hydraulic accumulator comprising a walled chamber, having a liquid inlet and outlet port at a lower portion thereof, when in the position of use; a conical valve seat surrounding the port; a valve having a conical peripheral lower portion seated on the valve seat; liquid in the lower portion of the chamber above the valve; gas under pressure in the chamber above the liquid; the valve seat taking the thrust of the liquid pressure on the valve; a laterally open groove in the periphery of the valve, open toward the conical valve seat and disposed above the said lower conical portion of the valve; the lower side of the groove, the groove bottom and the conical valve seat, constituting a three sided annular pocket; a rubber sealing ring of circular cross section in the groove normally resting on the bottom wall of the groove and by its resilience constrictingly embracing the groove bottom; the upper side of the groove being spaced from the ring; the space above the ring admitting pressure of the liquid to the upper side of the ring; the ring being deformed laterally by the pressure into pressure sealing engagement with the said three walls of the pocket, and sealing the port, independently of the pressure engagement of the valve and valve seat; the valve being free to rise and disengage the seat when, in the operation of the accumulator, pressure on the valve at the inlet side of the port exceeds that in the chamber, and to permit liquid to flow between the lower conical portion of the valve and the conical valve seat and to impinge upon the sealing ring; the bottom of the ring groove tapering outwardly upwardly at a cone angle less than that of the valve seat, whereby the force of the flow impinging on the ring may move it upwardly in the groove and the ring by its constricting resilience may retract its outer perimeter away from the conical valve seat and provide a free flow annular passage between the ring and the conical valve seat; a float in the chamber connected to the valve to raise it away from the valve seat upon rise of incoming liquid in the chamber and to lower it upon the valve seat to close and seal the port as aforesaid when the outgoing liquid falls to a predetermined level in the chamber.

13. A hydraulic accumulator comprising a walled chamber having an inlet and outlet port in a lower wall portion thereof when in the position of use; a valve seat surrounding the port; a valve and a float rigidly connected together and contained inside the chamber inwardly beyond the valve seat; means at the outer side of the valve provided with a coaxial threaded hole; a bridging element outwardly of the valve seat provided with a threaded element; the threaded element adapted to be screwed into the threaded hole when the valve is on the valve seat and to cause the bridging element to exert force of reaction on the chamber wall and draw the valve tight upon the valve seat and rigidly support the float thereby within the chamber, to prevent movement of the float and valve within the chamber during handling and transportation prior to installation of the accumulator.

DONALD C. GREEN.

REFERENCES CITED

The following references are of record in the file of this patent:

UNITED STATES PATENTS

| Number | Name | Date |
|---|---|---|
| 1,477,916 | Sikes et al. | Dec. 18, 1923 |
| 2,342,356 | Mercier | Feb. 22, 1944 |
| 2,385,016 | Mercier | Sept. 18, 1945 |